US005236531A

United States Patent [19]

Yokoyama

[11] Patent Number: 5,236,531

[45] Date of Patent: Aug. 17, 1993

[54] MANUFACTURING METHOD OF SQUARE BOTTOM CONTAINERS

[75] Inventor: Naomi Yokoyama, Ichikawa, Japan

[73] Assignee: Altech Co., Ltd., Tokyo, Japan

[21] Appl. No.: 621,020

[22] Filed: Jan. 8, 1991

Related U.S. Application Data

[62] Division of Ser. No. 353,096, May 17, 1989, Pat. No. 5,006,186.

[30] Foreign Application Priority Data

May 17, 1988 [JP] Japan ............ 63-118273
May 17, 1988 [JP] Japan ............ 63-118274

[51] Int. Cl.[5] ............ B32B 31/16; B65D 30/08; B65D 30/20

[52] U.S. Cl. ............ 156/227; 206/524.2; 383/113; 383/114; 383/116; 383/120; 493/246

[58] Field of Search ............ 383/123, 113, 114, 116, 383/120, 104, 121, 109; 493/189, 246; 156/227; 206/524.2; 426/127, 415

[56] References Cited

U.S. PATENT DOCUMENTS

| | | | |
|---|---|---|---|
| 2,162,258 | 6/1939 | Hultin | 383/113 X |
| 2,234,065 | 3/1941 | Vogt | 383/116 X |
| 2,282,258 | 5/1942 | Snyder | 493/189 X |
| 2,350,132 | 5/1944 | Rohdin | 493/189 |
| 3,147,903 | 9/1964 | Lipschutz et al. | 383/121 X |
| 3,277,798 | 10/1966 | Krauss | 383/121 X |
| 3,319,540 | 5/1967 | Stengle | 383/121 X |
| 3,349,991 | 10/1967 | Kessler | 383/120 |
| 4,566,927 | 1/1986 | Wood | 156/227 X |
| 4,584,705 | 4/1986 | Myklebust et al. | 383/121 X |
| 4,761,080 | 8/1988 | Schirmer | 206/524.2 |
| 4,874,656 | 10/1989 | Rantanen | 206/524.2 X |

FOREIGN PATENT DOCUMENTS

| | | | |
|---|---|---|---|
| 57507 | 4/1940 | Denmark | 383/121 |

*Primary Examiner*—Michael W. Ball
*Assistant Examiner*—Michele K. Yoder
*Attorney, Agent, or Firm*—McGlew and Tuttle

[57] ABSTRACT

This invention relates to the method for manufacturing a variety of square bottom containers by folding to the same side both of two brims of a sheet-shaped container of raw material of paper, aluminum foil, plastic laminate film and the like such that the brims mutually abut each other, forming a bonding agent or heat-seal layer on the outsides of both these butted brims, then forming the lower portion into a W-shape with an inverted V-shaped fold being provide in the midway, and then press-fitting the bonding agent or heat-seal layer from the outside of the formed sheet for its bonding or deposition, the press fit formed sheet defining a square bottom container having a bottom laminate which is flat with no overlap and having a heat seal film or the like which doesn't come inside the container. The method is efficient and the containers can be manufactured quite easily.

7 Claims, 14 Drawing Sheets

MANUFACTURING METHOD OF SQUARE BOTTOM CONTAINERS

This is a divisional application of application Ser. No. 353,096 filed May 17, 1989, now U.S. Pat. No. 5,006,156.

BACKGROUND OF THE INVENTION

1. Field of the Invention

The present invention relates to a bag and more particularly a gazette bag with a bottom which is square with folds provided on both sides, and also a container such as a carton container for containing milks or juices.

2. Description of the Prior Art

FIG. 37 through FIG. 46 show a manufacturing method of a conventional square bottom bag.

As shown in FIG. 37, the right side brim 102 and the left side brim 103 of a square shaped bag material 101 made of paper, plastic film and the like may be pasted together. The internal face of lower brim section 104 may then be pasted up by folding it upward along the folded line 105 in a horizontal direction to bond portion 107 to the surface 106 of bag material 101 as shown in FIG. 38. This folded and bonded section is folded further upward as shown in FIG. 39. Portion 107 is bonded to the surface 106 of bag material 101 to form the bottom face bonded section 108. The upper brim 109 side of bag material 101 is opened into a square form such that the bottom bonded section 108 is horizontal as shown in FIG. 40. The lateral face 110 is formed and the lateral face 114 to form a perpendicular plane face up to its top portion. This may be done by folding upward both the sides of the bottom bonded section to also form a square shaped bottom face 111, then by folding the lower section of lateral face 110 into the bottom face 111 side from the folded line 112 to bond the bottom face 111, and then a square bottom bag having a square shaped bottom face 111 whose upper brim 109 is opened to a square shape can be obtained as shown in FIG. 41.

Moreover, another manufacturing method of a conventional square bottom bag is generally known. This bag is formed by overlapping the left side brim 102 and the right side brim 103 of a square shaped bag material 102 to past them up together as illustrated in FIG. 37. The bag is then folded such that the whole bag may become a square shaped cylindrical form. The lower section of surface 106 is then folded into a trapezoid while folding the lower section of lateral side 110 horizontally toward the inside as shown in FIG. 42. The lower trapezoidal section of surface 106 is then folded inwardly along the folded line 113 to paste it together. This forms a square bottom bag having a square shaped bottom face 114 with upper brim 109 opened to a square shape as illustrated in FIG. 43.

Still another manufacturing method of a conventional square bottom bag is generally known. This bag is formed by overlapping the left side brim 102 and the right side brim 103 of a square shaped bag material 101 to past them up together as shown FIG. 37. The bag is then folded such that the whole bag may become a square shaped cylindrical form. This is done by folding inwardly the ends while providing the fold 115 running in a vertical direction at the center of the lower section of the lateral face 110 as shown in FIG. 44. The lower brims 104 of surface 106 are brought closer mutually to each other to bond them together and form the bottom face bonded section 116 as illustrated in FIG. 45. At the next step, the bottom bonded section 116 is folded horizontally as shown in FIG. 46 in such a manner that the lower portion of surface 106 may become horizontal and bond the lower section of surface 106. This method forms a square bottom bag having a square-shaped bottom 117 with an upper brim which is opened to a square shape as shown in FIG. 46.

However, according to the above discussed methods the overlapped areas (sealed areas) join to form the bottom face in any of the aforementioned square bottom bags, resulting in the possibility that the bag not only becomes unstable when it is erected but that liquid may also leak from the sealed areas.

In addition, in the case of material such as paper, aluminum foil, or nylon and polypropylene and the like, a low fusion point film like polyethylene having a heat sealing property is laminated on the material in the process of manufacturing the square bottom bags, such that the content of a filled bag may get into direct contact with these laminated films. This contact is an undesirable result according to the prior art methods. Also, the manufacturing machines and operation may become complex because the bag is to be folded intricately as described above.

OBJECTS OF THE INVENTION

The primary object of the invention is to provide a square bottom container in which the sealed areas and the overlaps may not be positioned at the bottom face of the bag structure.

An additional object of the invention is to provide a manufacturing method of a square bottom container where the film for heat seal may not be positioned on the internal face of container.

Still another object of the invention is to provide a manufacturing method of a square bottom container which can be manufactured efficiently by use of a simple machine.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 14B through FIG. 16 are perspective views showing the sequence for folding the laminate material;

FIG. 21 through FIG. 28 are perspective views showing the state where the laminate material whose wide brims have been deposited is to be opened;

FIG. 47 is a perspective view of laminate material,

FIG. 48 is a partial expanded sectional view of laminate material;

FIG. 49 is a squint view of laminate material both the side brims of which have been pasted together into a cylindrical state;

FIG. 50 and FIG. 51 are perspective views showing the sequence for folding the laminate material;

FIG. 52 is a sectional view taken along Line VI'—VI' of FIG. 51;

FIG. 53 is an expanded sectional view taken along VII—VII of FIG. 51;

FIG. 54 is an expanded sectional view taken along Line VIII—VIII of FIG. 51;

FIG. 55 is a perspective view showing the state of laminate material whose lower brim section is to be deposited;

FIG. 56 is an expanded sectional view taken along Line X—X of FIG. 55;

FIG. 57 is an expanded sectional view taken along Line XI'—XI' of FIG. 55;

FIG. 58 is a perspective sectional view taken along Line XII—XII of FIG. 57;

FIG. 59 is a perspective view of a laminate material showing the state where said material is to be opened;

FIG. 60 and FIG. 61 are perspective views of a square bottom bag which has been manufactured by the method of the invention;

FIG. 62 is a perspective view of laminate material showing the state where its upper brim section has been deposited;

FIG. 63 is a perspective view of another square bottom bag which has been manufactured bythe method of the invention; and, FIG. 64 is a vertical sectional view of a laminate material whose upper brim section has been deposited;

FIG. 65 is a vertical sectional view of FIG. 63.

FIG. 66 is a perspective view of laminate material both the brims of which have been folded;

FIG. 67 is a partial expanded sectional view of laminate material;

FIG. 68 is a perspective view of laminate material which has been folded along the center line in a horizontal direction;

FIG. 69 is a perspective view showing the state of depositing the bent section;

FIG. 70 is an expanded sectional view of the deposited bent section; and,

FIG. 71 and FIG. 72 are perspective views of a bag which has been manufactured in accordance with the method of this invention.

DETAILED DESCRIPTION OF THE PREFERRED EMBODIMENTS

Figure 1:
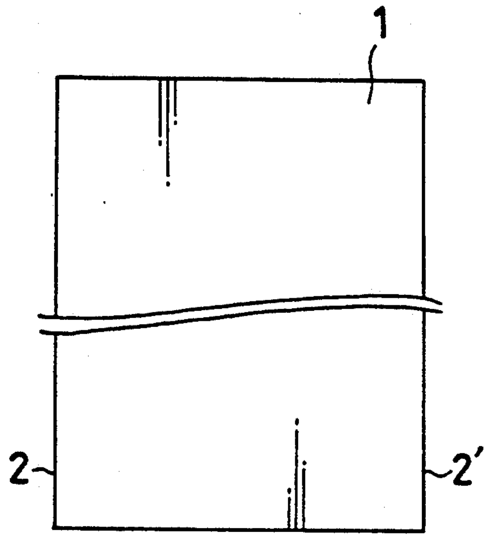
FIG. 1 is an elevation view of the raw material of a sheet shaped container.
Figure 2:
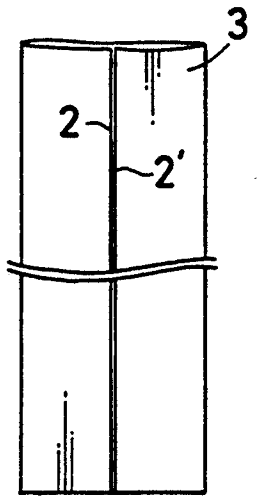
FIG. 2 is a plan view of the container raw material in the state which is bent to form a cylindrical body with brims of the material abutted together.

Referring to the drawings in particular the invention embodied in FIG. 1 through FIG. 12 includes brims 2 and 2' of a sheet material blank or film material blank for a container 1 (see FIG. 1). The blank is folded such that the brims of both sides abut each other as shown in FIG. 2. This arrangement provides a flat cylindrical body 3.

Figure 3:
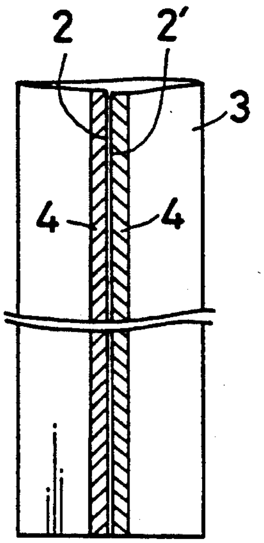
FIG. 3 is a plan view of the raw material in the state where a bonding agent is coated to the outside along both the brims.

Bonding agents 4 and 4' are applied along the outside of both the butted brims 2 and 2' as shown in FIG. 3.

Figure 4:
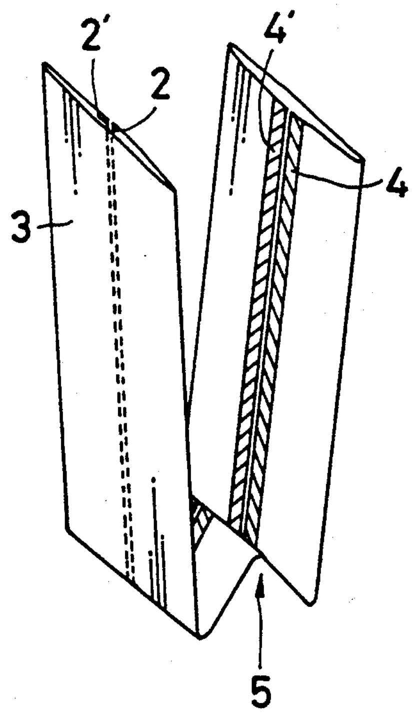
FIG. 4 is a perspective view of the raw material in the state where an inverted V-shaped folding is given to the area corresponding to a bottom section so that the cylindrical body is formed into a W-shape.
Figure 5:
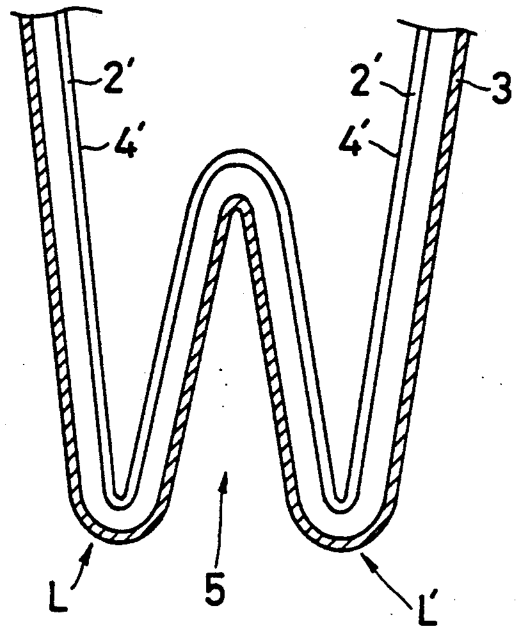
FIG. 5 is an expanded sectional view at the center of the bottom section.

The arrangement is disposed in a inverted V-shaped fold from the back of both the brims 4 and 4' of cylindrical body 3. The low section of cylindrical body 3 is then formed into a W-shaped structure as seen in FIG. 4 and 5.

Figure 6:
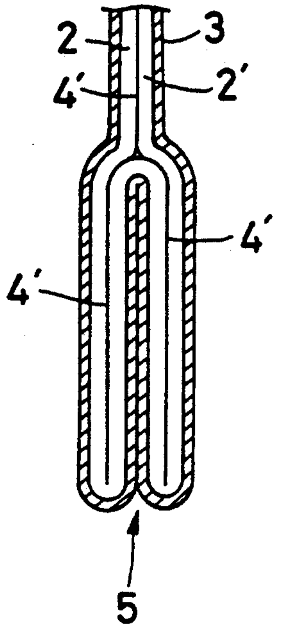
FIG. 6 is a sectional view of the bottom section in the state where the areas coated with bonding agent have been pasted together.

The bonding agent coated faces 4 and 4' of the cylindrical body 3 are brought together for their adhesion as shown in FIG. 6.

Figure 7:
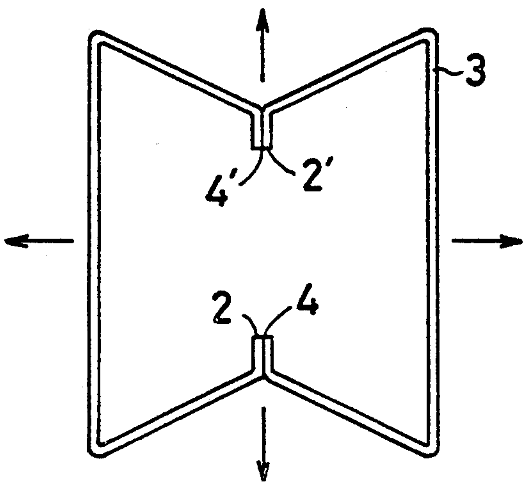
FIG. 7 is a plan view of the bag in the state in which the bag has been opened to form the bag structure.

The bag which has been fabricated as above is then unfolded in the arrow direction as shown in FIG. 7.

Figure 8:
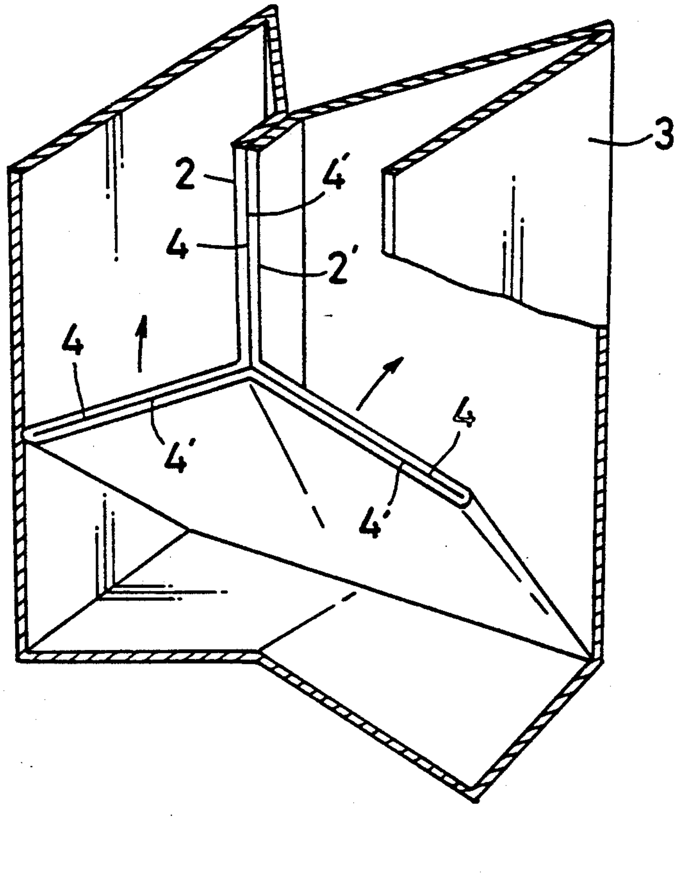
FIG. 8 is a partially cut-away perspective view during the bag formation process in which the internal bottom is to be formed into a square shape.
Figure 9:
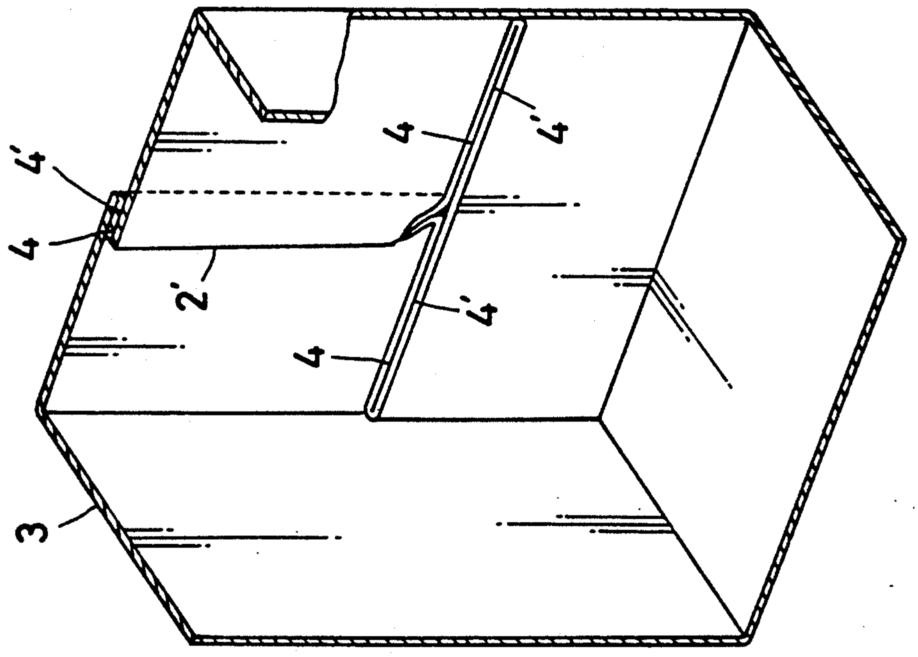
FIG. 9 is a partially cut-away perspective view showing the internal bottom of a bag which has been opened completely down to its square bottom.
Figure 10:
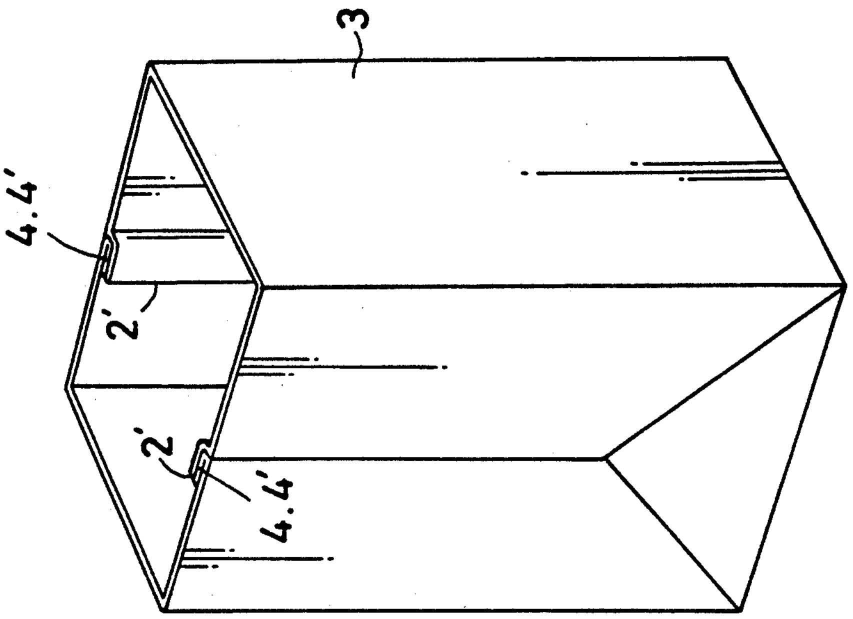
FIG. 10 is a perspective view showing the entire shape of a bag which has been made in accordance with the present invention.

When the bag is unfolded in this way, the area of inverted V-shaped fold 5 is raised upward in the direction of arrows in the internal bottom of bag as shown in FIG. 8. The bottom of the bag is then opened to a square shape. FIG. 9 shows the situation where the area of fold 5 on interior bottom has been erected vertically and pushed into the lateral wall, while FIG. 10 shows an entire shape of the bag in its assembled state.

Figure 12:
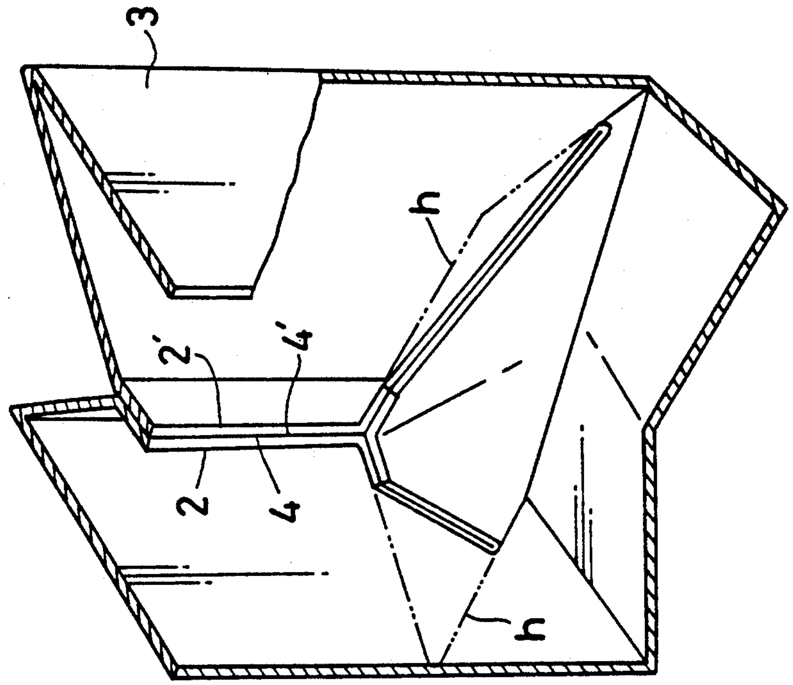
FIG. 12 is a partially cut-away perspective view showing theinternal bottom when a bag has been made using a cylindrical body shown in FIG. 11.
Figure 11:
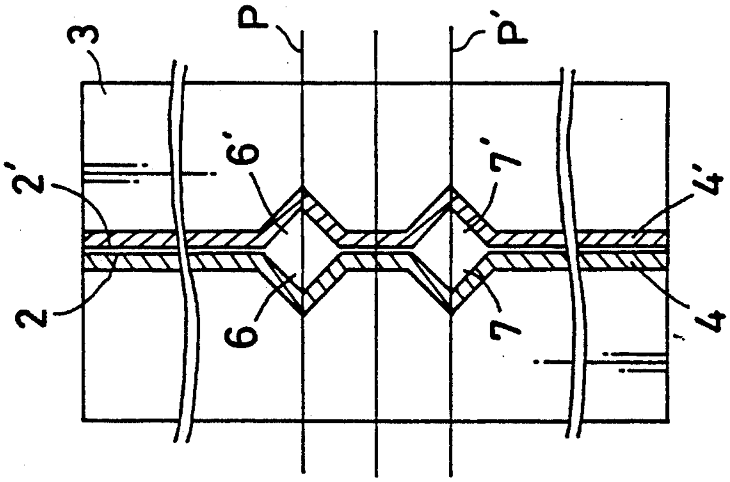
FIG. 11 is a view of cylindrical body showing a reduction of the section protruding into the internal bottom by providing notches.

FIG. 11 shows the state that the areas pleats which have been folded into an inverted V-letter shape as in FIG. 4 removed as much as possible to provide an aesthetically pleasing outward appearance. This different appearance results as areas remain on both sides of the interior bottom, thereby impairing the outward appearance as seen in FIG. 8 and 9. The cuts 6, 6', 7 and 7' of approximately 90 degrees are made to the butted section of both the brims 2 and 2' at the symmetrical position on both the sides of inverted V-shaped fold in the cylindrical body 3. These cuts are made such that the center lines P and P' of cuts 6,6', 7 and 7' come to the lower brims (L and L' in FIG. 4) of both the sides when disposing the bottom in a W-shape. If this setting is made, the triangle areas h and h' shown by a dashed line can be removed as shown in FIG. 12 and the obstacles can be eliminated from the internal bottom by this portion to a neat appearance when the bottom has been opened as discussed above with reference to FIG. 8 and 9.

In the aforementioned embodiment, these areas are coated with the bonding agents 4 and 4', but it is also acceptable to paste a low fusion point film like a polyethylene to these areas, press-fit it with a heat bar for depositing the said polyethylene and to paste up these areas together with a container raw material blank 1.

The bonding agent or the film for heat sealing, such as polyethylene, may either be coated or pasted after folding both the brims 2 and 2' as shown in FIG. 4 or may be coated or pasted before folding these brims.

Figure 13:
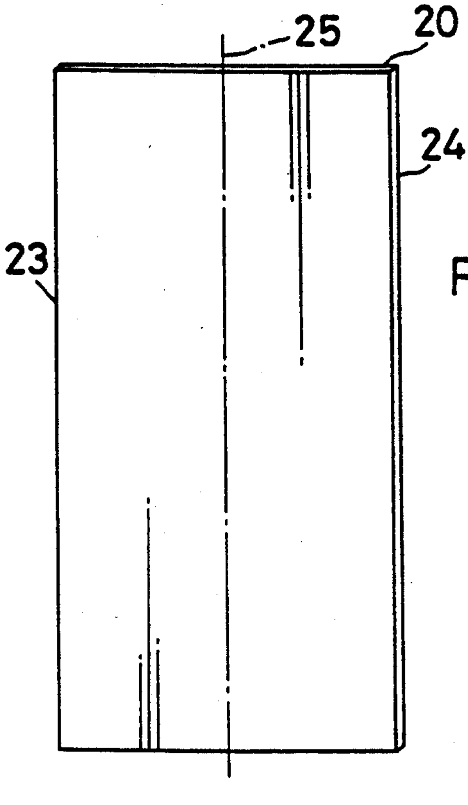
FIG. 13 is a perspective view of a laminate material.
Figure 14A:
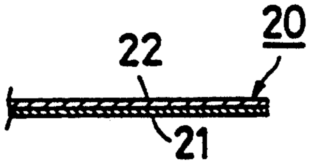
FIG. 14A is a partial expanded sectional view of a laminate material.

FIG. 13 through FIG. 36 are drawings showing additional embodiments of the invention. FIG. 13 shows a laminate material 20 as a square shaped container raw material blank to be used for manufacturing a square bottom bag. The square shaped laminate material 20 is a structure formed with inside material 21 joined integrally with outside material 22 as shown by the expanded sectional view in FIG. 14. The inside material 21 becomes the internal side of square bottom bag while the outside material 22 becomes the external side of the square bottom bag. The outside material 22 is made of a substance with a lower fusion point than that of inside material 21. Materials such as paper, bi-axially stretched polypropylene, stretched polyester, stretched polyamide, cellophane, aluminum foil, stretched polystyrene, polycarbonate and the like can be used of the inside material 21. Materials such as low density polyethylene, medium density polyethylene, high density polyethylene, directly chained type polyethylene, polyvinyl acetate, polypropylene, polyester, polyamide and the like can be used as the outside material 22 having a low fusion point. A large number of combinations of these materials is acceptable provided that there exists a difference in fusion points and that the outside material 22 has a lower fusion point than that of the inside material 21.

Figure 14B:
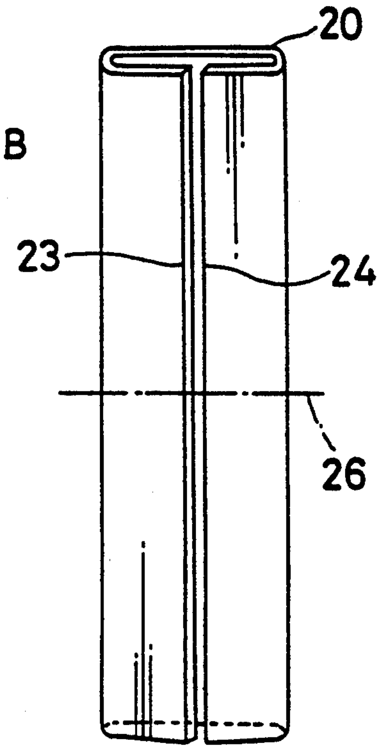
FIG. 14B is a front view of the laminate material in the state where both the brims have been folded.
Figure 15:
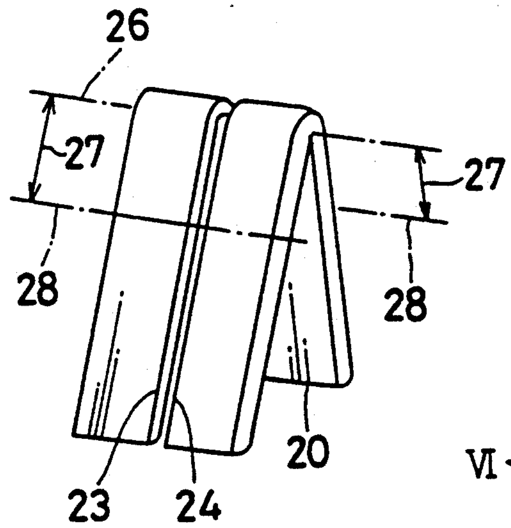
Figure 16:
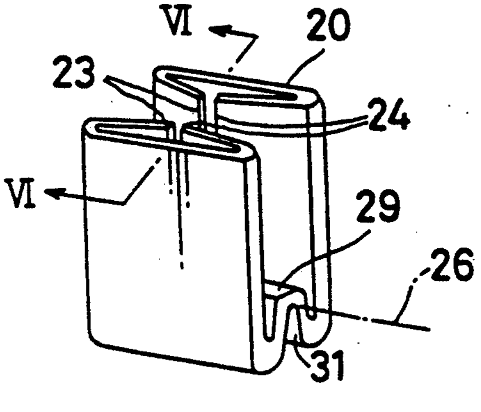
Figure 17:
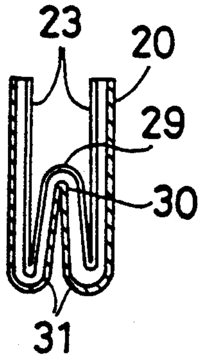
FIG. 17 is a sectional view taken along the line VI—VI of FIG. 16.
Figure 18:
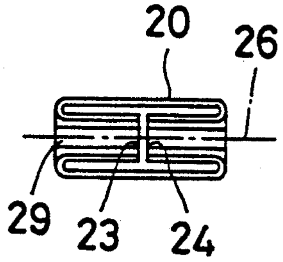
FIG. 18 is top plan view of FIG. 16.
Figure 19:
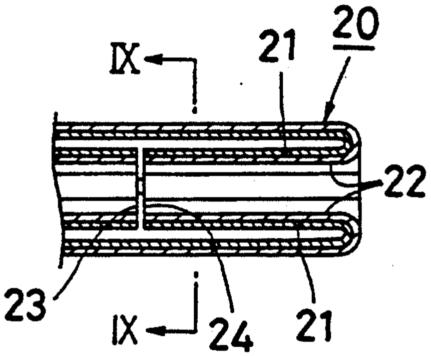
FIG. 19 is a partial expended horizontal sectional view of FIG. 18.
Figure 20:
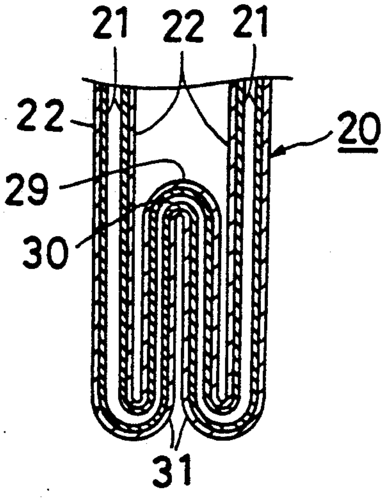
FIG. 20 is a sectional view taken along Line IX—IX of FIG. 19.

The left side brim 23 and the right side brim 24 of this type of square shaped laminate material blank 20 shall be folded in line with the center line 26 in a vertical direction of laminate material 21 so that its inside material 20 may come to the other internal side into the position shown in FIG. 14B. The laminate material 20 which has been folded as shown in FIG. 14B shall then be folded into the state as showing FIG. 15 along the center line 26 horizontally toward the direction that its left side brim 23 and right side brim 24 may be exposed to the external side, and moreover, in the equal distances 27 and 27 on upward and downward sides (in view of the situation shown in FIG. 14) from the center line 26 in horizontal direction. The laminate material 20 may then be folded along two fold lines 28 in parallel with the center line 26 horizontally toward the direction that the left side brim 23 and the right side brim 24 may be folded to the internal side, then the areas of center line 26 in the horizontal direction are overlapped in double to form angle sections 29 and 30 as shown in FIG. 16 through FIG. 18. The inside materials 21 faces other inside material 21 within the folded laminate material 20 as shown in FIG. 19 and FIG. 20. The outside material 22 with a lower fusion point is positioned outside the respective inside materials 22, while at the location along the left side brim 23 and the right side brim 24 the outside materials 22 face each other as shown in FIG. 19.

Figure 21:
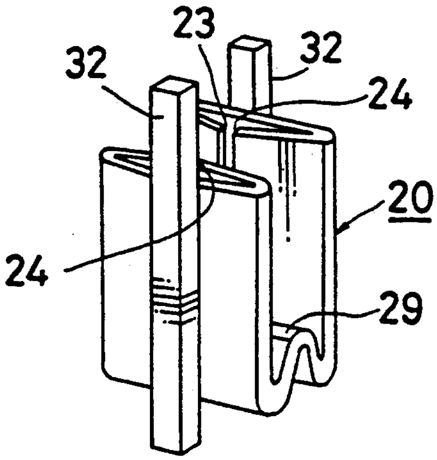
FIG. 21 is a perspective view in the state where the laminate material has been caught between electrode plates for deposition.
Figure 22:
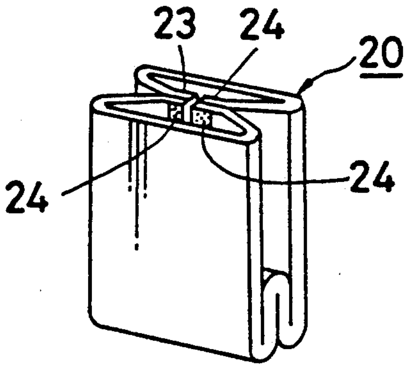
FIG. 22 is a perspective view of laminate material whose side brims have been deposited.
Figure 23:
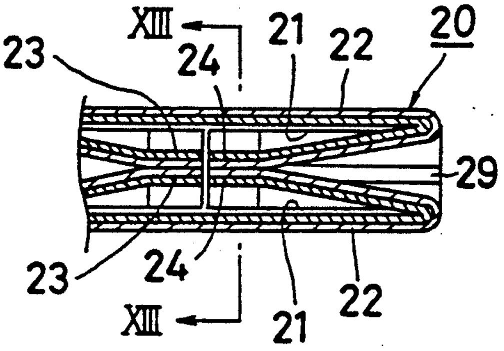
FIG. 23 is a partial expanded horizontal sectional view of FIG. 22.
Figure 24:
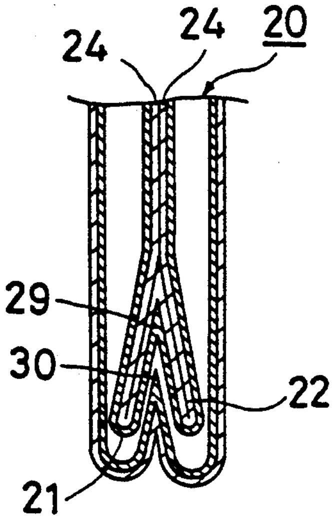
FIG. 24 is a sectional view taken along the Line VIII—VIII of FIG. 23.
Figure 25:
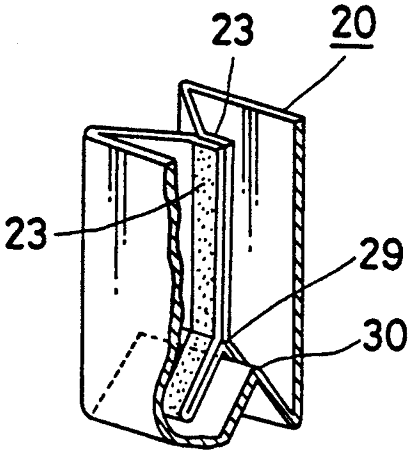

After applying a releasing agent to the lower face 31 of angle section 30 at the lower side of laminate material 20 which has been bent as shown and described, the center section in the vertical direction of laminate material 20 is positioned between such electrode plates 32 and 32 for deposition as a square rod shaped heat seal bar, a supersonic wave oscillating bar and the like as shown in FIG. 21. In this case, a releasing agent is previously coated onto the faces of electrode plates 32 for deposition in contact with the laminate material 20. When the center portion in vertical direction of laminate material 20 is heated up in the temperature range lower than the fusion point of inside material 21 but higher than the fusion point of outside material 22 by use of the electrode plates 32 for deposition, both the outside materials 22 and 22 of left side brims 23 and 23 as well as both the outside materials 22 and 22 of right side brims 24 and 24 (see FIG. 19) which come in mutual contact with each other inside the center portion in the vertical direction of laminate material 20 are fused into one body, and thus both of the external areas of the left side brims and both of the external areas of the right side brims are mutually deposited as shown in FIG. 22 through FIG. 25.

Figure 26:
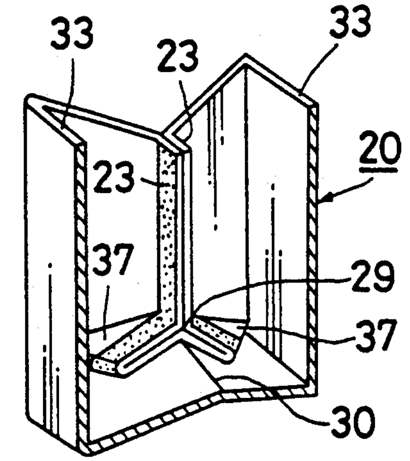
Figure 27:
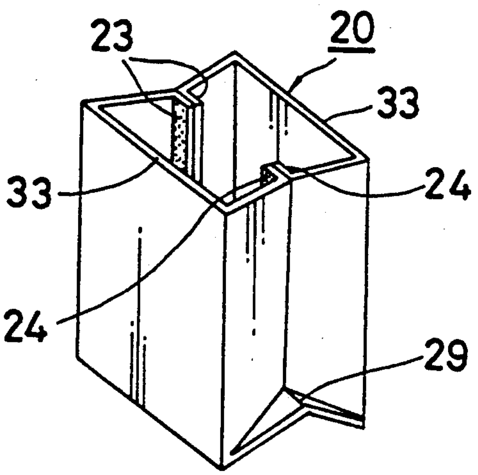
Figure 28:
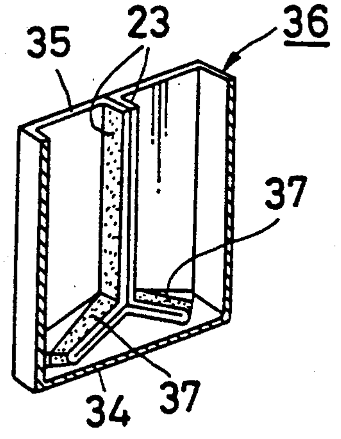
Figure 29:
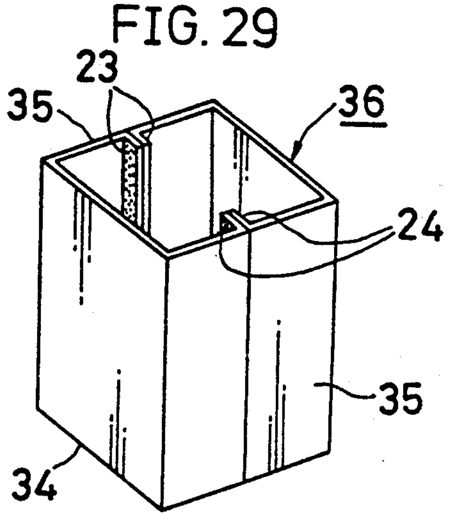
FIG. 29 is a perspective view of a square bottom bag which has been manufactured in accordance with the method of the invention.

When the laminate material 20 which has been deposited in this way, is opened from the released upper brim 33 as shown in FIG. 26 and FIG. 27 and is pressed downward in a way that the lower side angle section 30 may become flat, the upper side angle section 29 moves toward the right and left directions. The upper side angle section 29 then becomes a perpendicular flat face except for the deposited left side brims 23 and right side brims 24. This structure provides a square bottom bag 36 that includes a square shaped flat bottom face 34 and a perpendicular flat lateral face 36 as shown in FIG. 28 and 29. The left side brims 23 and the right side brims 24 and 24 which are deposited mutually to each other protrude inwardly to the square bottom bag 36 along the center running line in a vertical direction of lateral face 35 while the lower section of left side brim 23 and the lower shaped section of right side brim 24 together become a triangle shaped protrusive section 37 which protrudes inside the square bottom bag 36.

Figure 30:
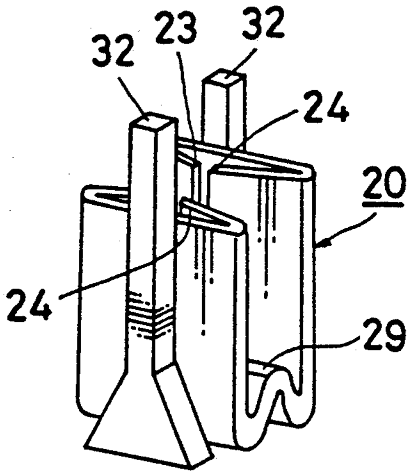
FIG. 30 is a perspective view of the laminate material inthe state where the laminate has been caught between the electrode plates for deposition in a different way from that of FIG. 21.
Figure 31:
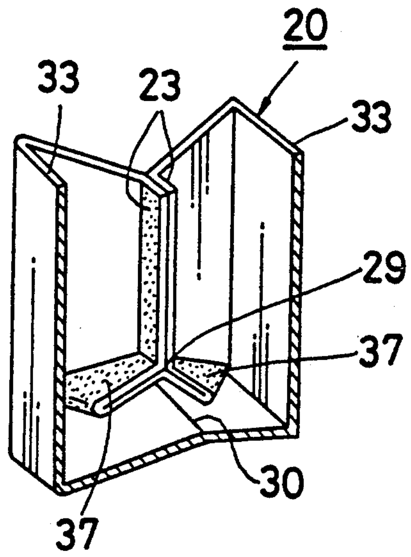
FIG. 31 is a perspective sectional view of laminate material in its opened state whose side brims are deposited by the electrodes for deposition in FIG. 30.

FIG. 30 shows the case for depositing the external sides of left side brims 23 and 23 and the external sides of right side brims 24 and 24 to each other by use of pot shaped electrodes 32 for deposition whose lower end expands to a triangle shape in place of square rod shaped electrode plates 32 shown in FIG. 21, and in this event, the entire internal face of triangle shaped protrusive section 37 shown in FIG. 31 is deposited.

Figure 32:
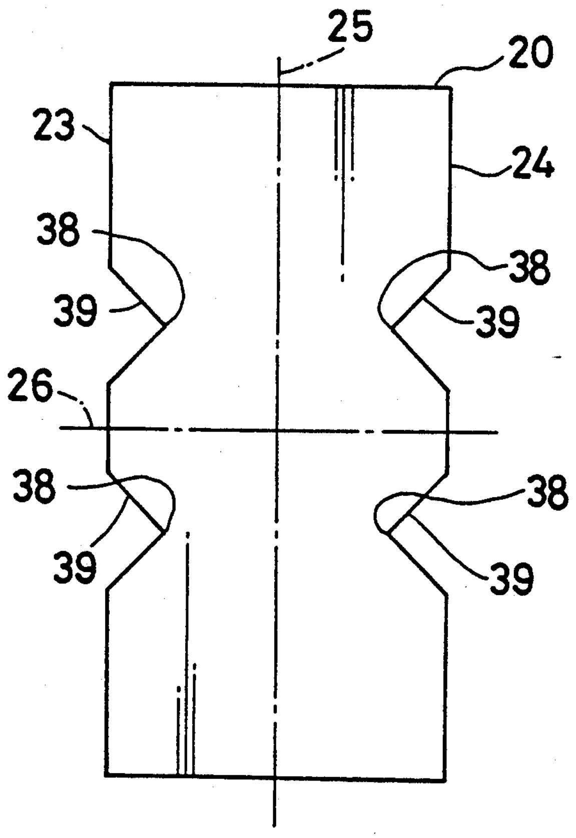
FIG. 32 is a front view of another starting laminate material section of another embodiment of the invention; and, FIG. 33 through 36 are perspective views showing the sequence of manufacturing a square bottom bag using the laminate material section of FIG. 32.
Figure 33:
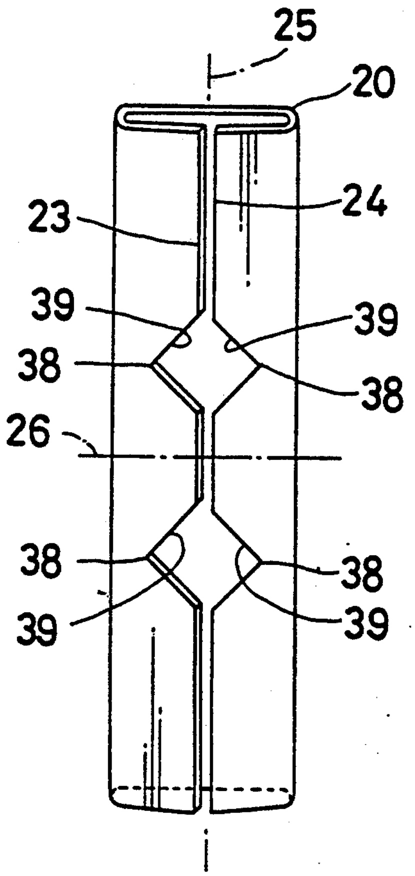

The embodiment shown in FIG. 32 is a bag where 2 notches are formed each of a right angle triangle of the same shape whose right angle top point 38 is directed to the center line 25 in the vertical direction laminate material 20. Pairs of these notches 39 are provided on the left side brim 23 and the right side brim 24 respectively. A slight distance in maintained between the upward and downward sides of the center line 26 and the notches in the horizontal direction of laminate material 20. The left side brim 23 and the right side brim 24 may be folded inside, in line with the center line 25 in a vertical direction as shown in FIG. 33. This provides two notches, each on the right and the left sides, facing each other with the center line 25 in vertical direction as its boundary. A regular square shaped notch disposed with a 45 tilted direction can be formed at two places with a slight distance kept apart on upward and downward sides of the center line 26 in the horizontal direction.

Figure 34:
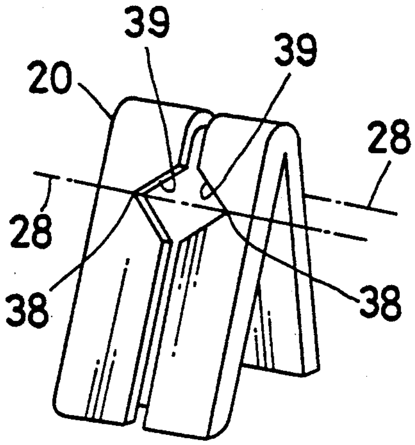
Figure 35:
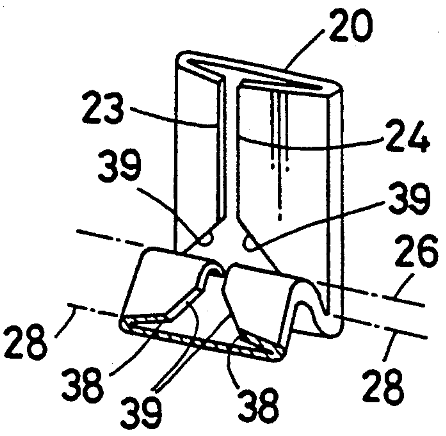

The laminate material 20 which has been folded into the position shown in FIG. 33 may be folded into the situation as shown in FIG. 34 along the center line 26 horizontally in such that the left side brim 23 and the right side brim 24 may be exposed to the external side. The laminate material 20 may be further bent along two folded lines 28 passing through the top point 38 of a right angle notch such that the left side brim 23 and the right side brim 24 may be folded to an interior side. The portion of center line 26 running in a horizontal direction becomes an angle section 29 as shown in FIG. 35. The notches 29 having the top point 38 of right angle notch on the folded line 28 are mutually overlapped on both the sides.

Figure 36:
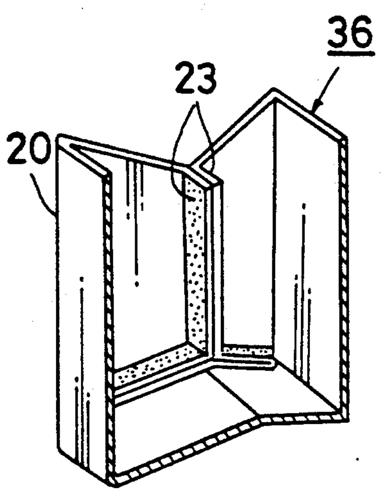
Figure 37:
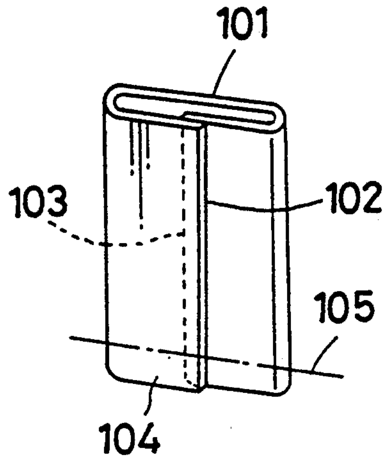
FIG. 37 through FIG. 46 are perspective views showing prior art manufacturing methods of making square bottom bags.
Figure 38:
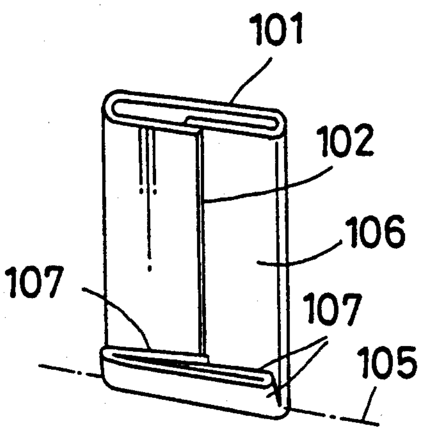
Figure 39:
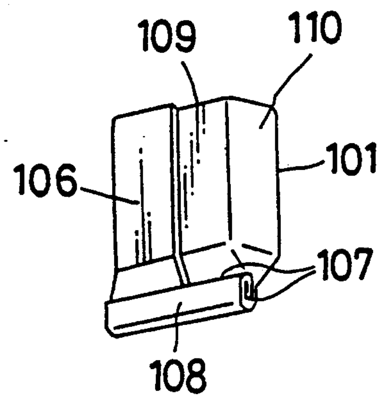
Figure 40:
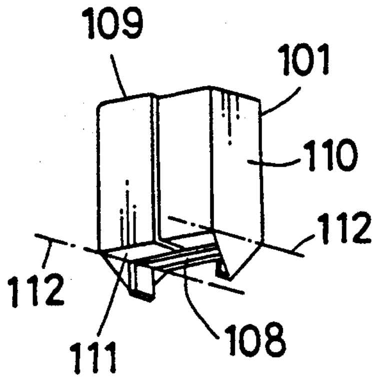
Figure 41:
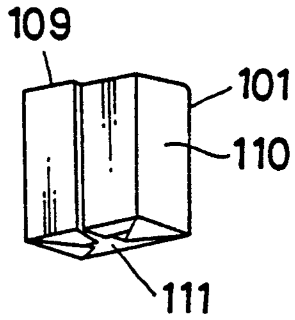
Figure 42:
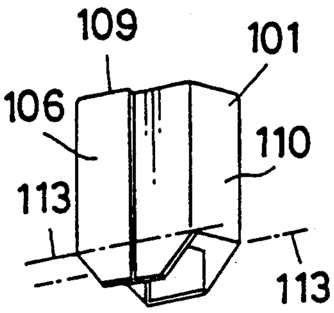
Figure 43:
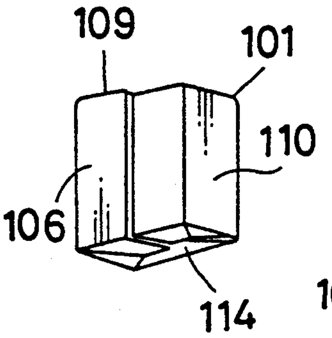
Figure 44:
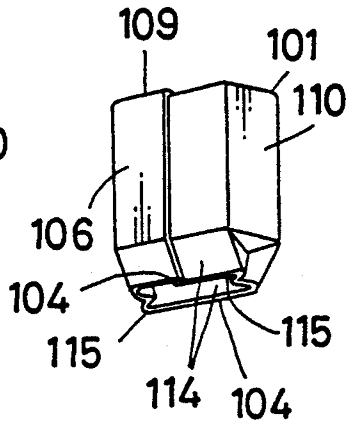
Figure 45:
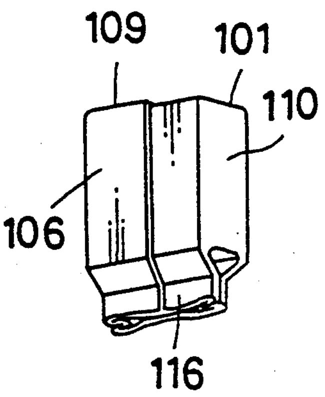
Figure 46:
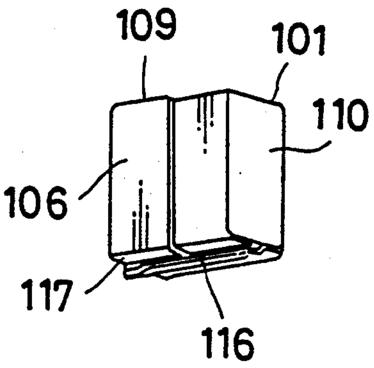

If the laminate material which has been folded in the way is caught from both the sides of the center line vertical direction with pot shaped electrodes 32 for deposition as shown in FIG. 30 and heated up under the same temperature conditions as the case described above, both the external sides of left side brims 23, both the external sides of right side brims 24 and 24 and both the outer circumferential sides of notches 39 and 39 are deposited or used with each other. If the laminate material 20, which has been deposited in the manner mentioned above, is opened in the same manner as the case explained by reference to FIG. 26 through FIG. 28, a square bottom bag can be obtained that has no triangle shaped protrusive portion 37 as shown in FIG. 31 and that is deposited with an identical width as illustrated in FIG. 36.

FIG. 47 through FIG. 65 are views showing further additional embodiments.

Figure 47:
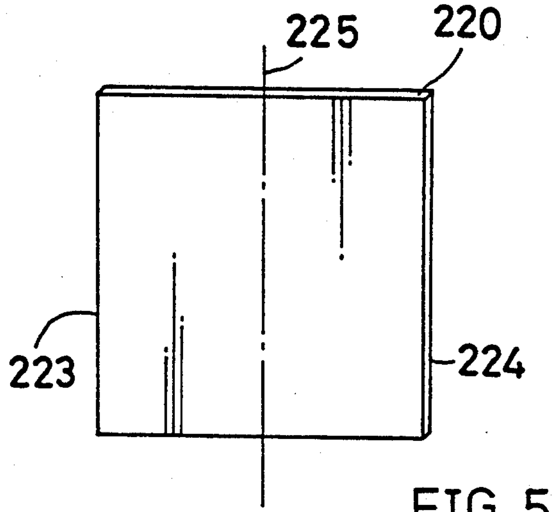
FIG. 47 through FIG. 65 show other embodiments of the invention.
Figure 48:
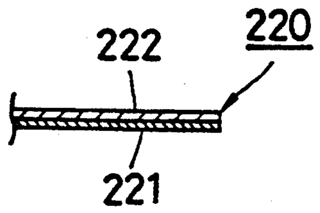

FIG. 47 is a view showing a laminate material 220 as a square shaped container raw material blank to be used for manufacturing a square bottom bag. This square shaped laminate material blank 220 is formed of an inside material 221 which has been joined integrally to its outside material 222 as shown in the expanded sectional view of FIG. 48. The inside material 221 becomes the internal side of a square bottom bag while the outside material 222 comes to the external side of a square bottom bag, where the outside material 222 is a substance having a lower fusion point a compared with that of the inside material 221. Such substances as paper, biaxially stretched polypropylene, stretched polyester, stretched polyamide, cellophane, aluminum foil, stretched polystylene, polycarbonate, etc. can be used for the inside material 221, while such substances as low density polyethylene, mediumdensity polyethylene, high density polyethylene, directly chained polyethylene, polyvinyl acetate, polypropylene, polyester, polyamide, etc. can be used as the outside material 222 with a low fusion point. Any combination of materials is acceptable provided that there is a difference in fusion points and that the outside material 222 has a lower fusion point than that of the inside material 221.

Figure 49:
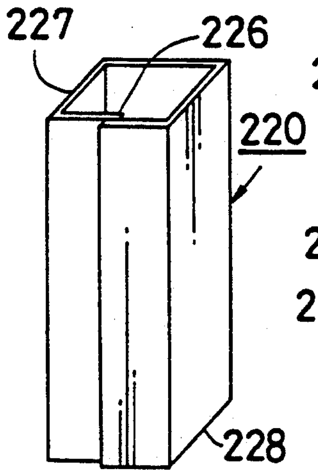

After the left side brim 223 and the right side brim 224 of this type of a square shaped laminate material 220 have been folded to the side of vertical center line 225 so that the inside material 221 may be folded inside, the left side brim is pasted up with the right side brim 224 with a bonding agent to form a bonded section 226 running in a vertical direction as shown in FIG. 49. The laminate material 220 is then folded such that it may become a square shaped cylindrical body.

Figure 50:
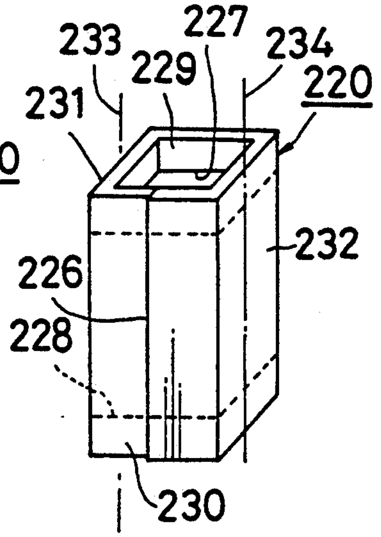
Figure 52:
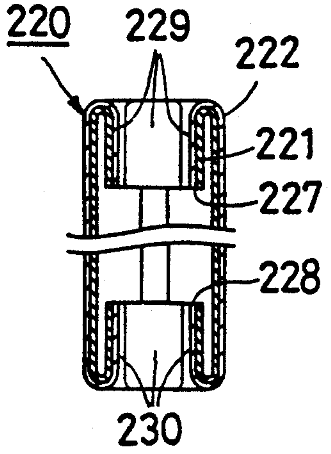
Figure 53:
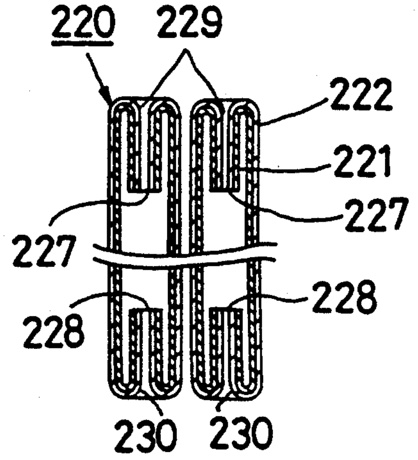
Figure 54:
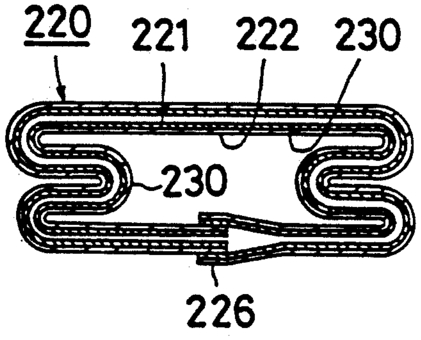

The upper brim section 227 and the lower brim section 228 of laminate material 220, which has been formed into a square shaped cylindrical body, are folded inwardly of the cylindrical body as shown in FIG. 50 to form the folded sections 229 and 230. The right and left lateral faces 231 and 232 opposite to the cylindrical body are folded inwardly of the cylindrical body as shown in FIG. 51 with the respective center lines 233 and 234 running in a vertical direction as the folded lines, then the outside materials 222 face each other entirely on the internal sides of folded sections 229 and 230 as shown in FIG. 52 through FIG. 54.

Figure 51:
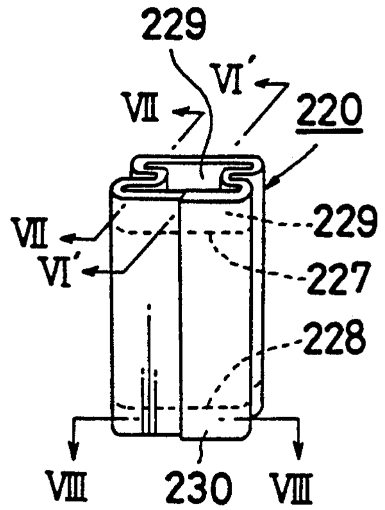
Figure 55:
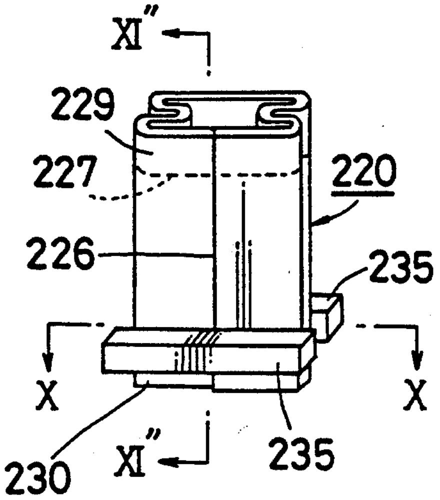
Figure 56:
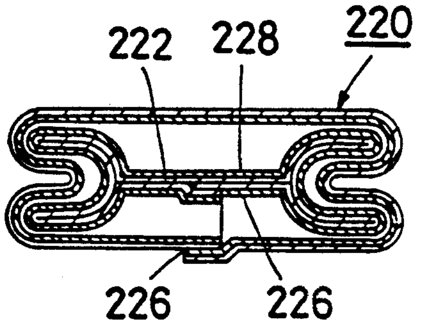
Figure 57:
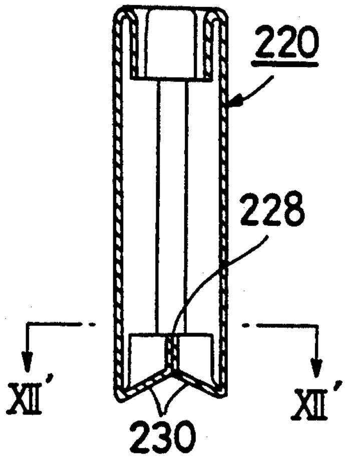
Figure 58:
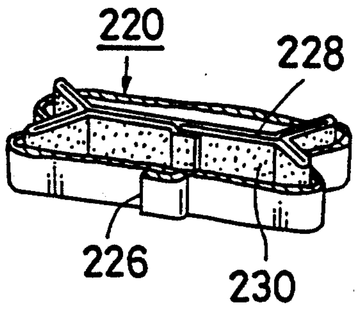

Both of the outside faces of lower brim section 228 which have been bent inwardly, of the laminate material 220 as shown in FIG. 51 shall be caught by such electrode plates 235 and 235 for deposition as a square rod shaped heat seal bar, a supersonic wave oscillating bar, etc. as shown in FIG. 55. In this event, a releasing agent shall previously be coated onto the faces of electrode plates 235 and 235 for deposition or fusing, this agent gets into contact with the laminate material 220. The outside of laminate material 220, into which the lower brim section 228 has been folded by the electrode plates 235 and 235 for deposition at the temperature range lower than the fusion point of inside material 221 but higher than the fusion point of outside material 222 having a lower fusion point, both the outside materials at the lower brim section 228 which has been folded as a bent section 230 are fused into one body, and the lower brim section 228 can be entirely deposited as shown in FIG. 56 through FIG. 58.

Figure 59:
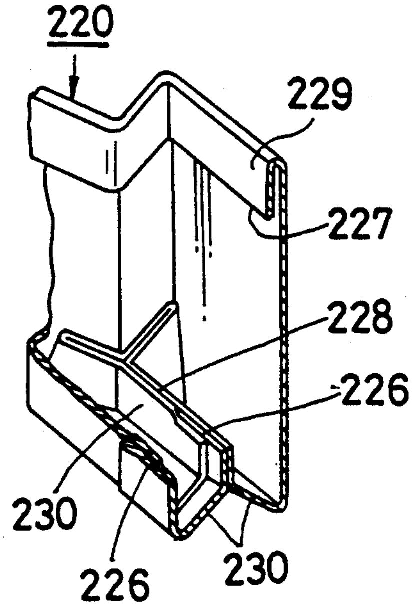
Figure 60:
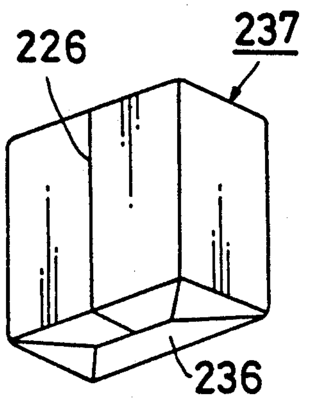
Figure 61:
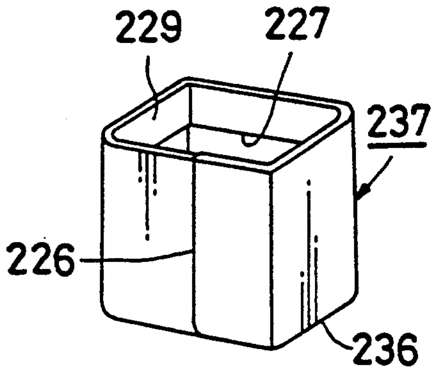

If the laminate material 220, which has been deposited in this way, is opened from the side of the released upper brim section 227 and is kept opened as shown in FIG. 59 by pressing downward, the lower side bent section 230, and the bent section 230 becomes a flat face with the deposited lower brim section 228 remaining protrusive to the interior. This structure provides a square bottom bag having a square shaped flat bottom face as shown in FIG. 60 and FIG. 61. This structure can be used as a bag whose upper section is opened.

Figure 62:
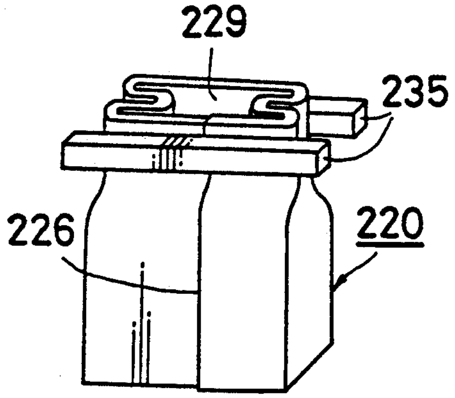
Figure 63:
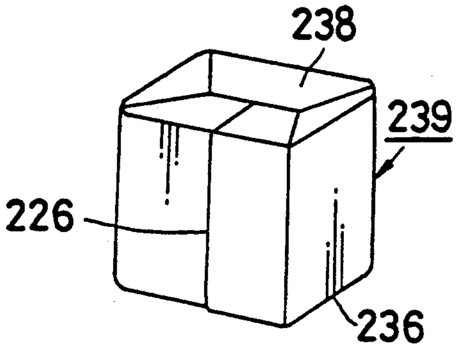
Figure 64:
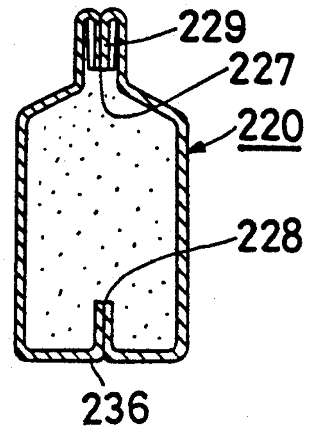

If both bags outside faces at the upper brim section 227 (see FIG. 61) are bent inwardly as shown FIG. 62, containing a filler material inside the aforementioned square bottom bag 237, are caught between the electrode plates 235 and 235 for deposition and are heated up under the same temperature conditions as that for the case described above, the outside materials 222 (see FIG. 52 and FIG. 53) of upper brim section 227 which has been folded as a bent section 229 are deposited into one body and the upper brim section is entirely deposited as shown in FIG. 64, thereby a square bottom bag 239 whose upper face has also been sealed as shown in FIG. 63 can be obtained.

Figure 65:
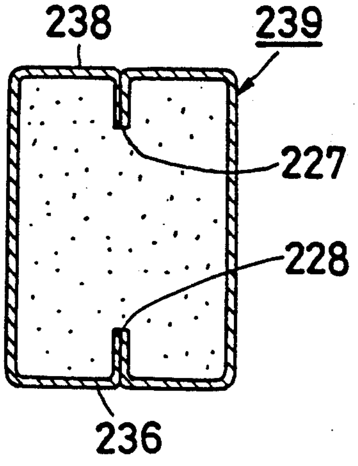

The deposited upper brim section 227 and lower brim section 228 form a structure in which they protrude to the inside of a square bottom bag 239 as shown in FIG. 65.

Moreover, additional embodiments are introduced in FIG. 66 through FIG. 72.

Figure 66:
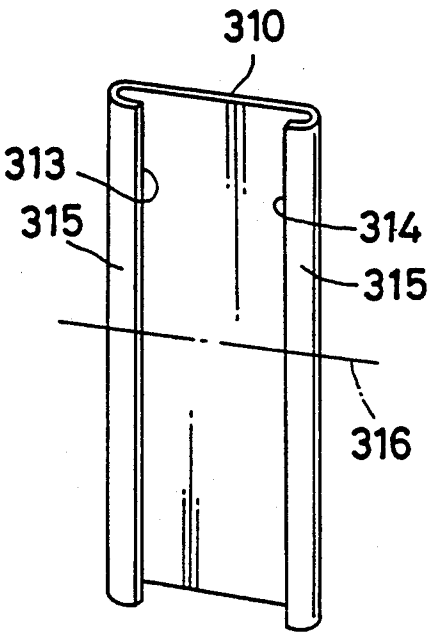
FIG. 66 through FIG. 72 show other embodiments of the invention, where.
Figure 67:
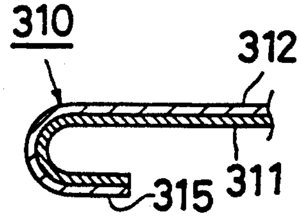

FIG. 66 is a view showing a laminate material 310 as the square shaped container raw material blank to be used for manufacturing a bag. The square shaped laminate material 310 is formed with an inside material 211 joined integrally with its outside material 312 as shown in the expanded sectional view of FIG. 67. The inside material 311 becomes the internal side of a bag while the outside materila 312 becomes the external side of a bag, where the outside material 312 uses the substance with lower fusion point than that of the inside material 311. Such a substances as paper, biaxially stretched polypropylene, stretched polyester, stretched polyamide, cellophane, aluminum foil, stretched polystylene, polycarbonate, etc. can be used for the inside material 311 while such substances as low density polyethylene, medium density polyethylene, high density polyethylene, directly chained polyethylene, polyvinyl acetate, polypropylene, polyester polyamide, etc, can be used as the outside material 312 having a lower fusion point. Any combination of materials is acceptable provided that there is a difference in fusion points and that the outside material 312 has a lower fusion point than the inside material 311.

The left side brim 313 and the right side brim 314 of this type of square shaped laminate material 310 shall be folded into the formation of the bent sections 315 running in a vertical direction such that the inside material 311 becomes the internal side.

Figure 68:
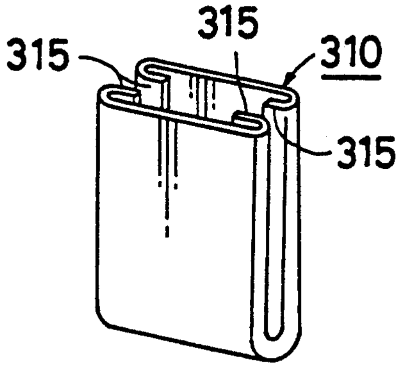
Figure 69:
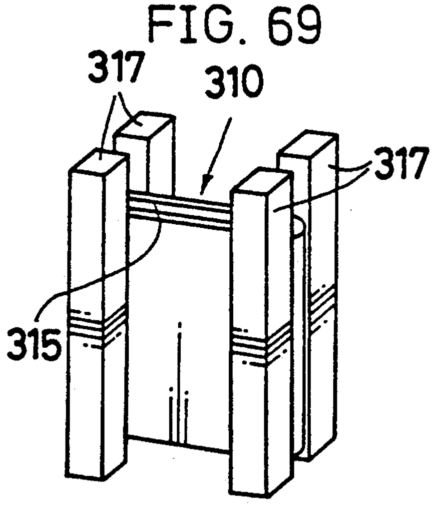
Figure 70:
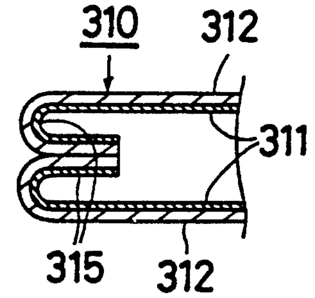

The laminate material 310 may be folded along its center line 316 running in a horizontal direction to form an arrangement as shown in FIG. 68. The bent sections 315 are directed to the inside, the outside materials 312 face each other in the bent sections 315. Both the outside faces of bent sections 315 of laminate material 310 which have been folded as shown in FIG. 68 shall be caught between electrode plates 317 and 317 for deposition as a square rod shaped heat seal bar, a supersonic wave oscillating bar and the like as shown in FIG. 69. In this case, a releasing agent shall previously be coated onto the face of electrode plate 317 for deposition, which agent gets into contact with the laminate material 310. And when the outside of laminate material 310 into which the bent section 315 has been folded is heated up within the temperature range lower than the fusion point of the inside material 311 but higher than the fusion point of the outside material, (having a lower fusion point) by use of the electrode plates 317 for deposition, both the outside materials 312 of bent section 315 are deposited and fused to each other into one body as shown in FIG. 70 with the right and left bent sections 315 being deposited and fused throughout their lengths respectively, thus a bag as shown in FIG. 71 can be formed.

Figure 71:
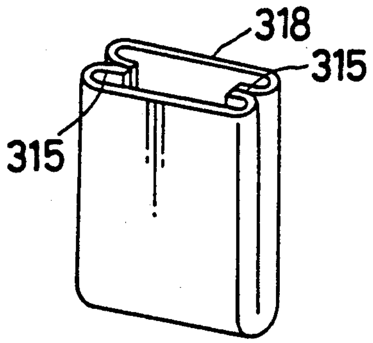
Figure 72:
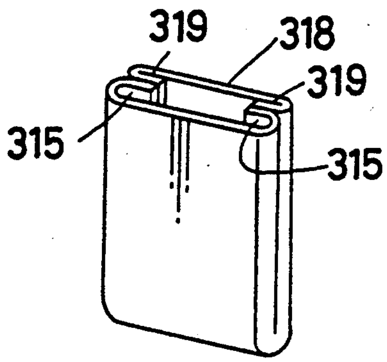

Though the bent section 315 protrude inside the bag 318 in the case of the bag 318 shown in FIG. 71, if a sealant 319 is coated onto one face of bent section 315 to the internal side of bag 318, a bag whose bent section won't protrude to the interior can be formed.

This invention can be expected to provide the effects as follows by manufacturing a square bottom container according to the method as described above.

Due to the absence of sealed areas and overlapped areas on the square bottom face, the bag becomes stable when it has been erected, and moreover there is no fear of leakage and pin holes.

As the laminate film for heat sealing is not positioned in the internal face of container, its contents are protected against being in direct contact with this laminate film such that their is no possibility of subsequent change in taste and change in quality of the contents of the container.

A manufacturing machine used to form the structure is simple in construction, because the square bottom can be formed by merely folding the sheet. In addition, the bags can be produced continuously on the production line and therefore the production cost can be reduced.

While specific embodiments of the invention have been shown and described in detail to illustrate the application of the principles of the invention, it will be understood that the invention may be embodied otherwise without departing from such principles.

What is claimed is:

1. A method of manufacturing a square bottom container, comprising:

providing a laminated blank including an inside material, having an inside material fusion point, laminated to an outside material having an outside material fusion point, said outside material fusion point being a lower temperature value than said inside material fusion point; bringing a brim edge at one end of said blank together with a brim edge at another end of said blank; adhering said brim edge at one end of said blank to said brim edge at another end of said blank after bringing said brim edges together and folding said blank with said adhered brim edges into a square-shaped cylindrical body having an outer side with said outside material and having an inner side with said inside material; folding a lower brim section of said cylindrical body to position the outside material of said lower brim section in the interior of said cylindrical body; subsequently to said step of folding a lower brim section, folding lateral faces of the said cylindrical body inwardly about opposed lateral face center lines so outside material of said lateral faces are opposed in folded sections of said lateral faces; and applying heat, at temperature above said inside material fusion point and below said outside material fusion point, to a lower section of the exterior of said cylindrical body with said inwardly folded lateral faces, to fuse said outside material of said folded lower brim section to bond said outside material of said folded lower brim section in the interior of said cylindrical body with inwardly folded lateral faces.

2. A method accordingly to claim 1, further comprising pressing said fused lower brim sections of said inwardly folded cylindrical body downwardly to provide a container having a square-shaped flat-bottom face.

3. A method according to claim 1, further comprising folding an upper brim section, of said shaped cylindrical body, inwardly prior to inwardly folding said lateral faces and applying heat to the exterior of said cylindrical body at a temperature below said inside material fusion point and above said outside material fusion point to heat bond said outside material of said upper brim section in the interior of said cylindrical body.

4. A process according to claim 1, wherein inside material is selected from the group consisting of paper biaxially stretched polypropylene, stretched polyester, stretched polyamide, cellophane, aluminum foil, stretched polystyrene and polycarbonate.

5. A method according to claim 1, wherein said outside material is formed of a material selected from the group consisting of low density polyethylene, directly chained polyethylene, polyvinyl acetate, polypropylene and polyester polyamide.

6. A method of manufacturing a square bottom container, comprising:

providing a laminated blank including an inside material, having an inside material fusion point, laminated to an outside material having an outside material fusion point, said outside material fusion point being a lower temperature value than said inside material fusion point; bringing a brim edge at one end of said blank into overlapping arrangement with a brim edge at another end of said blank to form overlapping brim edges and adhering said overlapping brim edges; folding said blank with said adhered brim edges into a square shaped cylindrical body having an outer side with said outside material and having an inner side with said inside material; folding a lower brim section of said cylindrical body to position the outside material of said lower brim section in the interior of said cylindrical body, subsequently to said step of folding a lower brim section, folding lateral faces of the said cylindrical body inwardly about opposed lateral face center lines so outside material of said lateral faces are opposed in folded sections of said lateral faces, and applying heat, at temperature above said inside material fusion point and below said outside material fusion point, to a lower section of the exterior of said cylindrical body with said inwardly folded lateral faces, to fuse said outside material of said folded lower brim section to bond said outside material of said folded lower brim section in the interior of said cylindrical body · with inwardly folded lateral faces.

7. A method of manufacturing a square bottom container, comprising:

providing a laminated blank including an inside material, having an inside material fusion point, laminated to an outside material having an outside material fusion point, said outside material fusion point being a lower temperature value than said inside material fusion point; positioning a brim edge at one end of said blank over a brim edge at another end of said blank and adhering the brim edges; folding said blank into a square-shaped cylindrical body having an outer side with said outside material and having an inner side with said inside material; folding a lower brim section of said cylindrical body to position the outside material of said lower brim section in the interior of said cylindrical body; subsequently to said step of folding a lower brim section, folding lateral faces of the said cylindrical body inwardly about opposed lateral face center lines so outside material of said lateral faces are opposed in folded sections of said lateral faces; and applying heat, at temperature above said inside material fusion point and below said outside material fusion point, to a lower section of the exterior of said cylindrical body with said inwardly folded lateral faces, to fuse said outside material of said folded lower brim section to bond said outside material of said folded lower brim section in the interior of said cylindrical body with inwardly folded lateral faces.

* * * * *